US012320309B2

(12) United States Patent
Werblinski et al.

(10) Patent No.: US 12,320,309 B2
(45) Date of Patent: Jun. 3, 2025

(54) METHOD FOR OPERATING AN INTERNAL COMBUSTION ENGINE, AND CONTROL DEVICE

(71) Applicant: Schaeffler Technologies AG & Co. KG, Herzogenaurach (DE)

(72) Inventors: Thomas Werblinski, Fürth (DE); Wolfgang Christgen, Seukendorf (DE); Andreas Mayer, Erlangen (DE)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 0 days.

(21) Appl. No.: 18/274,749

(22) PCT Filed: Jan. 31, 2022

(86) PCT No.: PCT/DE2022/100080

§ 371 (c)(1),
(2) Date: Jul. 28, 2023

(87) PCT Pub. No.: WO2022/167041

PCT Pub. Date: Aug. 11, 2022

(65) Prior Publication Data

US 2024/0167429 A1 May 23, 2024

(30) Foreign Application Priority Data

Feb. 2, 2021 (DE) .................... 10 2021 102 364.5

(51) Int. Cl.
*F02D 13/02* (2006.01)
*F02D 41/00* (2006.01)

(52) U.S. Cl.
CPC .... *F02D 13/0207* (2013.01); *F02D 2041/001* (2013.01); *F02D 2200/0406* (2013.01)

(58) Field of Classification Search
CPC .......... F02D 13/0207; F02D 2041/001; F02D 2200/0406; F02D 13/06; F02D 41/123;
(Continued)

(56) References Cited

U.S. PATENT DOCUMENTS 5,588,411 A * 12/1996 Kreuter .............. F02D 41/0002 123/90.15
6,470,853 B1 * 10/2002 Leone ...................... F01L 9/20 123/90.15
(Continued)

FOREIGN PATENT DOCUMENTS

DE 19932665 A1 1/2000
DE 19952037 A1 5/2000
(Continued)

*Primary Examiner* — Phutthiwat Wongwian
*Assistant Examiner* — Susan E Scharpf
(74) *Attorney, Agent, or Firm* — Matthew V. Evans

(57) ABSTRACT

The disclosure relates to a method for operating an internal combustion engine. The internal combustion includes an intake manifold via which a cylinder can be supplied with fresh air, an inlet valve via which, when it is open, the fresh air can flow from the intake pipe into the cylinder, and a variable valve drive by means of which the opening duration or the relative timing of the inlet valve event is variable in relation to a crankshaft position. During a starting of the internal combustion engine, when the intake manifold pressure differs from the intake manifold desired pressure, a filling pilot control of the cylinder is undertaken by the variable valve drive by the fresh air supply being reduced in comparison to the fresh air supply at the intake manifold desired pressure. The disclosure further relates to a control device for an internal combustion engine that enables low-emission operation.

18 Claims, 4 Drawing Sheets

(58) Field of Classification Search
CPC ................. F02D 41/062; F02D 41/126; F02D 2041/002; F02D 41/0005
See application file for complete search history.

(56) References Cited

U.S. PATENT DOCUMENTS

| | | | | |
|---|---|---|---|---|
| 6,875,154 | B2 * | 4/2005 | Mitsutani | F02D 41/021 477/107 |
| 2003/0015156 | A1 * | 1/2003 | Leone | F02M 25/08 123/90.15 |
| 2004/0084002 | A1 * | 5/2004 | Mitsutani | F02N 11/04 123/179.4 |
| 2004/0250792 | A1 * | 12/2004 | Mizobuchi | F02D 13/06 123/325 |
| 2007/0006831 | A1 * | 1/2007 | Leone | F01L 13/0015 123/90.15 |
| 2008/0276904 | A1 * | 11/2008 | Surnilla | F02D 41/3029 123/406.45 |
| 2009/0095244 | A1 * | 4/2009 | Leone | F02D 41/042 123/345 |
| 2013/0297187 | A1 * | 11/2013 | Doering | F02N 11/0844 701/104 |
| 2015/0047607 | A1 * | 2/2015 | Glugla | B60W 10/11 903/902 |
| 2017/0008527 | A1 * | 1/2017 | Nishida | B60W 10/06 |
| 2017/0356371 | A1 * | 12/2017 | Rollinger | F02D 13/04 |

FOREIGN PATENT DOCUMENTS

| | | | |
|---|---|---|---|
| DE | 102006031572 | A1 | 1/2001 |
| DE | 102008036635 | A1 | 3/2010 |
| DE | 102013202196 | A1 | 8/2014 |
| DE | 102015107539 | A1 | 11/2015 |
| DE | 102016111505 | A1 | 1/2017 |
| DE | 102016216116 | A1 | 3/2018 |
| DE | 102017011301 | B3 | 1/2019 |
| WO | 2013101282 | A2 | 7/2013 |

* cited by examiner

METHOD FOR OPERATING AN INTERNAL COMBUSTION ENGINE, AND CONTROL DEVICE

CROSS-REFERENCE TO RELATED APPLICATIONS

This application is the U.S. National Phase of PCT Application No. PCT/DE2022/100080 filed on Jan. 31, 2022, which claims priority to DE 2021 102 364.5 filed on Feb. 2, 2021, the entire disclosures of which are incorporated by reference herein.

TECHNICAL FIELD

The disclosure relates to a method for operating an internal combustion engine.

BACKGROUND

Modern internal combustion engines in motor vehicles, also referred to below as combustion engines, are increasingly not being operated continuously, but are being dragged in certain operating phases. Combustion engines in motor vehicles are usually connected to wheels of the vehicle via the drive train via a vehicle clutch. In the event of deceleration, the combustion engine is dragged along via the closed drive train by the inertia of the motor vehicle, wherein the motor vehicle is decelerated by a drag torque exerted by the combustion engine. The operating mode of the combustion engine, in which the combustion engine is dragged without injecting fuel into the cylinders, is referred to as overrun operation.

The drag torque of the combustion engine is mainly caused by friction and charge-exchange losses. However, it can be desirable, particularly in hybrid drive systems, to reduce the drag torque of the combustion engine as much as possible to use the torque provided via the drive train and resulting from the moment of inertia for recuperation of electrical energy when the drive train is closed. In such a case, it is desirable that the drag torque of the unfired combustion engine is as low as possible.

It is known from the prior art to use variable valve drives to influence the drag torque. In this regard, DE 199 32 665 A1 proposes a method for controlling gas exchange valves of a combustion engine by means of variable valve control, in which the inlet valves are controlled variably in overrun operation.

However, the sole reliance on a minimal drag torque leads to undesirable side effects. If, for example, the throttle valve is opened during overrun operation, there are still losses due to the flow of fresh air through the cylinders, charge-exchange losses and compression losses when the combustion engine is dragged along. The cold and oxygen-rich fresh air fed through the combustion chamber lowers the temperature in the exhaust system and causes it to deviate from the optimum temperature window of the exhaust gas after-treatment system. In the case of a three-way catalytic converter, the saturation with oxygen is also critical, because as soon as one switches from overrun operation to combustion engine operation, the saturation with oxygen must be compensated for via temporarily enriched engine operation. In the meantime, the efficiency of the catalytic converter decreases as a result of the temperature being lowered, and the enrichment after switching to the drive mode leads to increased fuel consumption and thus even higher emissions. To operate the catalytic converter in its optimum lambda window, an excess of oxygen must therefore be avoided. If the combustion engine is designed as a gasoline engine with a particulate filter, the oxygen can lead to its uncontrolled and undesired regeneration. This can lead to thermal overload, which not only damages the gasoline particulate filter itself, but also other components.

Closing the throttle valve can also be problematic. If a critical negative pressure develops in the combustion chamber, an air-oil volume flow can occur in the combustion chamber due to a negative pressure gradient to the crankcase. When combustion operation is resumed, emissions increase and the oil consumption of the combustion engine increases.

The air scavenging of the engine in the overrun phases can also be prevented by variable valve drive systems. This can be, for example, deactivation of all valve lifts, fully variable intake lift control, or a combination of exhaust valve deactivation with an extended inlet phase adjustment. Such systems are known from DE 10 2016 216 116 A1, DE 10 2008 036 635 A1, DE 10 2015 107 539 A1, DE 10 2013 202 196 A1, DE 10 2017 011 301 B3, DE 199 52 037 A1 or WO 2013/101 282 A1. DE 10 2006 031 572 B4 discloses a generic method.

All concepts that lead to an effective zero mass flow in the overrun phase have in common that the intake manifold pressure between the throttle valve and the inlet valves increases continuously during the overrun phase until the pressure has completely equalized to the ambient atmospheric pressure. Due to the effective zero mass flow via the throttle valve, this loses its throttling effect and cannot be used for filling control during the first working cycles immediately after the engine is restarted.

If the engine is nevertheless restarted, this leads to an increased filling of the cylinders with fresh air within the first working cycles. A high fresh air mass in connection with a combustion with $\lambda=1$ lead to a high torque output of the combustion engine immediately after restart. The condition lasts until the intake manifold volume is "emptied" and the throttle valve can once again ensure filling control. Such a method is proposed in DE 10 2016 111 505 A1, according to which a transition control device is provided which first restores the negative pressure in the intake manifold between overrun and firing operation, so as to then switch to regular firing operation. It is imperative that the phase determined by the transition control device is run through, which means that it also takes place when there is sufficient negative pressure. Maintaining this phase is complex to implement and can be perceived as a time-delayed restart of the internal combustion engine.

A possible solution to avoid the torque peak is an ignition angle intervention and thus an actively induced deterioration in the combustion efficiency. This measure leads to additional consumption.

SUMMARY

The object of the disclosure is to resolve the above-mentioned conflicting goals and to specify a method for operating an internal combustion engine which enables a changeover between firing operation and overrun operation, in which the emissions are low and which at the same time allows the overrun operation to be exited as quickly and comfortably as possible, in particular when the desired drive torque is low and the engine is to be restarted under a low load requirement. Furthermore, it is the object of the disclosure to specify a control device for an internal combustion engine that enables a low-emission operation.

The method according to the disclosure relates to a method for starting, such as for restarting, the internal combustion engine after an overrun phase. The method according to the disclosure is described below using a variable valve drive with a camshaft adjuster. For this purpose, the internal combustion engine is provided with an intake camshaft and, for example, an electro-mechanically adjustable camshaft adjuster for the inlet valves, and an exhaust camshaft and an electro-mechanically adjustable camshaft adjuster for actuating the exhaust valves. The control times and/or the valve lift can also be variable electro-hydraulically or by other means.

In the overrun phase, the air mass flow is reduced by the variable valve drive to avoid the aforementioned disadvantages. This can be done by adjusting the control times of a camshaft adjuster to a value that is not useful for gasoline engine firing operation, but which represents a phase position that is optimized for the dragging operation. The phase position of the intake and exhaust camshafts for a reduced drag torque of the combustion engine thus enables good recuperation without generating an air mass flow through the catalytic converter, and without generating a critical negative pressure in the combustion chamber of the combustion engine.

When entering the overrun phase, the internal combustion engine changes from an operating point with power output to an operating point with power consumption. Before entering the overrun phase, the inlet valves typically open shortly after top dead center (TDC). Meanwhile, the exhaust valves typically close just before TDC.

In the overrun phase, the internal combustion engine is dragged by the rolling vehicle via the transmission. To do this, the operating point is changed. The camshaft adjusters can adjust to the target angle at the adjustment speeds that are usual for these systems, so that the inlet valves now open well after TDC and the exhaust valves close well before TDC. Generally, this adjustment is performed as quickly as possible. At the same time, the throttle valve is briefly opened to set constant conditions in the intake manifold also as quickly as possible. As a result of these changes, the engine valves are open in the area of BDC in the overrun phase. Only a small air mass is moved, which is drawn in and pushed out equally from an intake and exhaust manifold. The air mass flow across the respective valves is balanced at zero. This minimizes the internal friction and the pumping losses caused by intake, compression, expansion, and exhaust, so that the vehicle is braked as little as possible. At the same time, an air mass flow induced by the internal combustion engine that cools the exhaust system is largely avoided.

If the internal combustion engine is part of a hybrid engine unit, it is advantageous to minimize the drag torque of the combustion engine in addition to eliminating an air mass flow through the exhaust system. In this regard, the air mass flow can be minimized under the secondary condition of the lowest possible drag torque. In another embodiment, the drag torque is minimized under the secondary condition of the lowest possible air mass flow. It is also possible to use one of the methods depending on an external manipulated variable such as the temperature of the exhaust after-treatment system. Depending on the characteristics map formed by the parameters of drag torque and air mass flow, both parameters can also be reduced to a range close to their minimum if, for example, the gradient of the parameters is low there, so that the control or regulation is particularly insensitive to changing external parameters and requires no readjustment. This facilitates the implementation of the regulation strategy.

When combustion resumes for the power output of the combustion engine, the camshaft adjusters adjust to the target angle for restarting the engine. In this regard, according to the disclosure, the camshaft adjustment does not always take place as quickly as possible, but is delayed at least when the pressure in the intake manifold differs from the intake manifold desired pressure and the load requirement is low. In particular, when ambient pressure has built up in the intake manifold, unwanted torque peaks which have a negative impact on drivability are avoided.

The torque peaks could be avoided by an ignition angle intervention. However, this leads to a deterioration in the combustion efficiency and is therefore disadvantageous in terms of energy because it leads to an unwanted increase in consumption. In contrast, with the proposed filling control by the valve drive, the theoretically achievable adjustment speed is reduced if the intake manifold pressure falls below a threshold value and/or the engine restart at low load ("soft engaging") is desired.

If the engine has been restarted and the intake manifold volume has not yet been emptied, the valve drive can also be used after the restart phase for filling control until the conventional filling control, for example by means of a throttle valve, can be used effectively again. If the intake manifold volume has already been emptied during the restart, conventional regulation can also take place. Finally, the valve drive can be used in parallel with the throttle valve for filling control.

In a further development of the disclosure, the filling of the cylinder with fresh air is reduced by the variable valve drive in such a way that the torque which is built up does not exceed the torque target specification, or exceeds it by less than 50%. The first variant enables particularly smooth re-engagement of the internal combustion engine without a perceptible torque peak. In the second variant, the internal combustion engine is engaged more quickly, but the torque peak that would arise without the filling control is reduced.

When the internal combustion engine is refired after the overrun phase, the inlet valve control time is continuously adjusted to be "early", wherein the adjustment speed of the inlet valve control time is reduced in the event that the intake manifold pressure differs from the intake manifold desired pressure compared to the adjustment speed at the intake manifold desired pressure. The continuous adjustment can be controlled or regulated as a function of the intake manifold pressure.

In an example embodiment, there is no ignition angle intervention when the internal combustion engine is refired.

The disclosure also relates to a control device with which an internal combustion engine can be operated using the method presented.

An exemplary embodiment of the disclosure is described in more detail below with reference to drawings.

DETAILED DESCRIPTION

Figure 4:
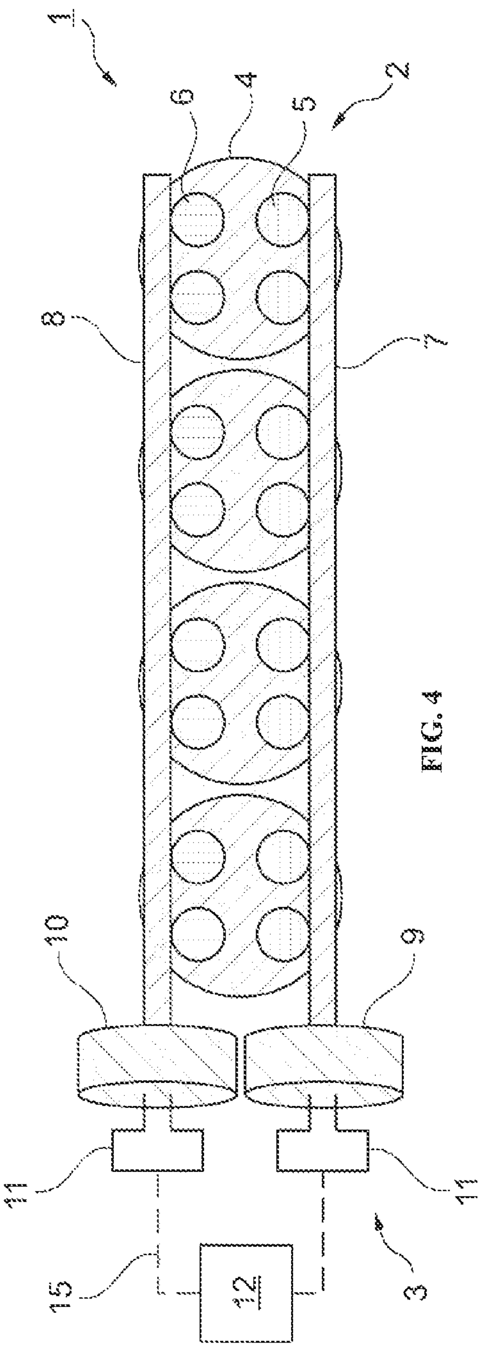
FIG. 4 shows a schematized internal combustion engine.
Figure 5:
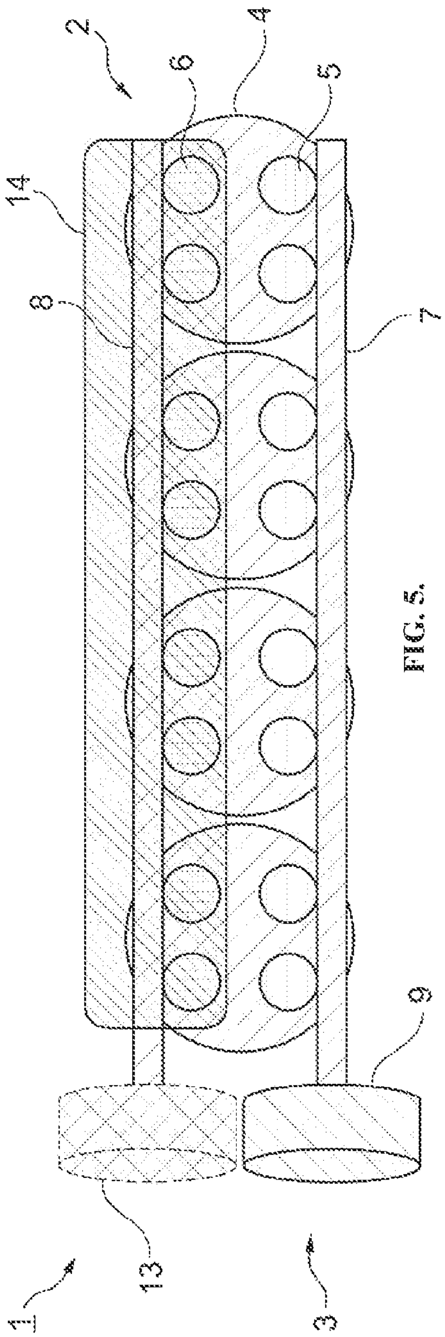
FIG. 5 shows a further schematized internal combustion engine.

FIGS. 4 and 5 each show an internal combustion engine 1 as a reciprocating piston engine having cylinders 4 and a crankshaft, not shown, as a detail and in a roughly schematized manner. It is designed as a four-cylinder in-line engine, wherein the disclosure can also be implemented in internal combustion engines 1 having a different number of cylinders and design. The valve control of the internal combustion engine 1, i.e., the valve drive, is designated by 3. As a four-valve engine, the internal combustion engine 1 has two inlet valves 5 and two exhaust valves 6 per cylinder 4. An intake camshaft is designated by 7 and an exhaust camshaft is designated by 8. The intake camshaft 7 can be adjusted with a camshaft adjuster 9 on the intake side, and the exhaust camshaft 10 can be adjusted with a camshaft adjuster 10 on the exhaust side. In the exemplary embodiments considered, the camshaft adjusters 9, 10 are designed in the form of electro-mechanical adjusters, each having an adjusting gear designed as a harmonic drive, and each have an electric motor 11 for adjusting the phase position of the respective camshaft 7, 8 in relation to the crankshaft of the internal combustion engine 1. In a manner known per se, the camshafts 7, 8 are driven by the crankshaft via a belt drive or a gear train, wherein a drive gear 13 is firmly connected to the housing of the adjusting gear of the camshaft adjuster 9, 10 or is an integral part of this housing.

To actuate the camshaft adjusters 9, 10, a control device 12 is provided, which optionally takes on further control tasks. Data connections between the control device 12 and the camshaft adjuster 9, 10 are designated by 15. A switching device 14 enables the exhaust valves 6 to be switched off if necessary. The switching device 14 of the internal combustion engine according to FIG. 5 can be actuated electromechanically and can be designed with switchable rocker arms.

Figures 1A, 1B, 1C, 1D:
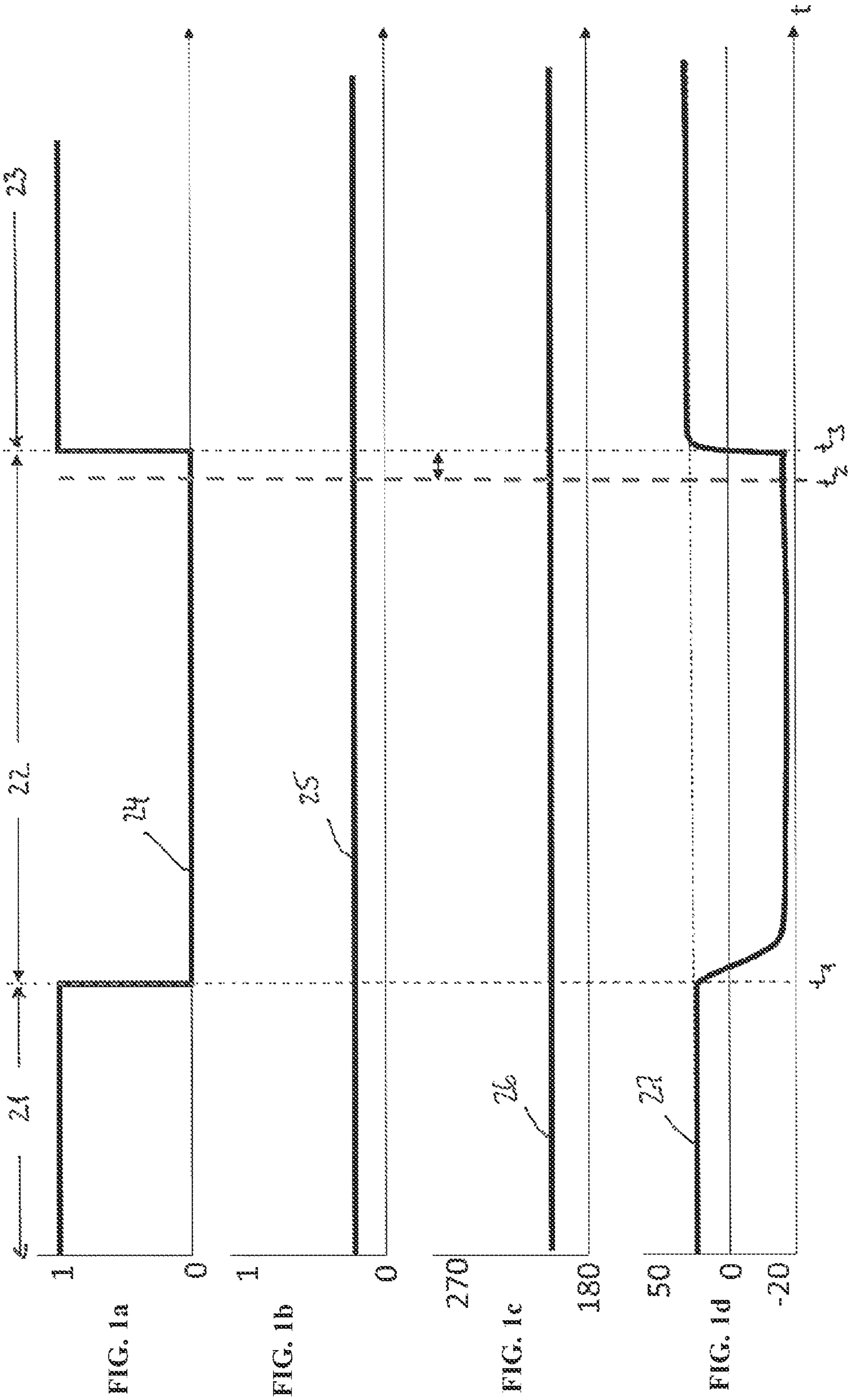
FIG. 1*a* shows a schematic, chronological development of the injection activity of a first internal combustion engine without a variable valve drive according to the prior art when entering and exiting the overrun phase.
FIG. 1*b* shows a schematic, chronological development of the intake manifold pressure of the first internal combustion engine without a variable valve drive when entering and exiting the overrun phase.
FIG. 1*c* shows a schematic, chronological development of the inlet valve closing time in °CA after TDC of the first internal combustion engine without a variable valve drive when entering and exiting the overrun phase.
FIG. 1*d* shows a schematic, chronological development of the engine torque in Nm of the first internal combustion engine without a variable valve drive when entering and exiting the overrun phase.

FIGS. 1*a* to 1*d* schematically show the chronological development of some characteristic values of a first internal combustion engine 1 according to the prior art, which does not have a variable valve drive. The internal combustion engine 1 is fired in a first firing phase 21, which lasts up to the point in time $t_1$. FIG. 1*a* digitally represents the fuel injection 24 of the internal combustion engine 1, which takes place in the firing phases 21, 23 (value is 1) and is omitted in the overrun phases 22 (value is 0). The internal combustion engine 1 is switched off at the point in time $t_1$, and the internal combustion engine 1 is refired in a refiring phase 23 at the point in time $t_3$. There is no fuel injection between these points in time. Already at the point in time $t_2$, which is shortly before the point in time $t_3$, the driver or a control device initiates a torque specification, which initiates the restart process of internal combustion engine 1. At the point in time $t_3$, the data processing for restarting the internal combustion engine 1 is complete.

As soon as the vehicle enters the overrun phase 22, the fuel injection 24 is suspended. The intake manifold pressure is regulated with the throttle valve. In the example shown in FIG. 1*b*, it is kept constantly low. The inlet valve closing time 26 shown in FIG. 1*c* remains at the target angle for engine restart and is also not varied. The throttle valve typically remains closed in the overrun phase 22. A torque-neutral restart can thus take place quickly after the torque specification by the driver, without overshoots occurring at the beginning of the refiring phase 23. The engine torque 27 (FIG. 1*d*) thus essentially corresponds to the torque target specification. However, air can get into the exhaust after-treatment system during the overrun phase 22, so that enrichment is required after restarting the engine, which increases emissions.

FIGS. 2*a* to 2*d* schematically show the chronological development of the characteristic values of a second internal combustion engine 1 according to the prior art, which, in contrast to the first internal combustion engine 1, has a variable valve drive 3. The graph according to FIG. 2*a* corresponds to the graph of FIG. 1*a*. The internal combustion engine 1 is thus fired in the first firing phase 21, firing is stopped in the overrun phase 22, and the refiring phase 23 begins at the point in time $t_3$. The variable valve drive 3 is used to prevent oxygen enrichment in the exhaust after-treatment system. To this end, it prevents air scavenging of the engine in the overrun phase 22 by shutting off the exhaust valves 6 and adjusting the inlet valves 5 to an extended adjustment range. In the overrun phase 22, the exhaust valve lifts are deactivated in a cycle-synchronous manner with the suspension of the fuel injection 24 and are reactivated in a cycle-synchronous manner with the start of the fuel injection 24 when restarting. The variable valve drive 3 can be used on the intake side to maximally reduce the engine drag torque in the overrun phase 22. The charge-exchange work reduced in this way enables, particularly in combination with P0 and P1 hybrid vehicles, a large amount of energy to be recuperated, which increases the overall efficiency of the drive train. For this purpose, extremely late inlet valve phase positions that are not useful for the firing operation 21, 23 are set, so that the maximum inlet valve lift is approximately at bottom dead center (BDC). Here, too, the throttle valve position can remain almost completely closed within the overrun phase 22.

Figures 2A, 2B, 2C, 2D:
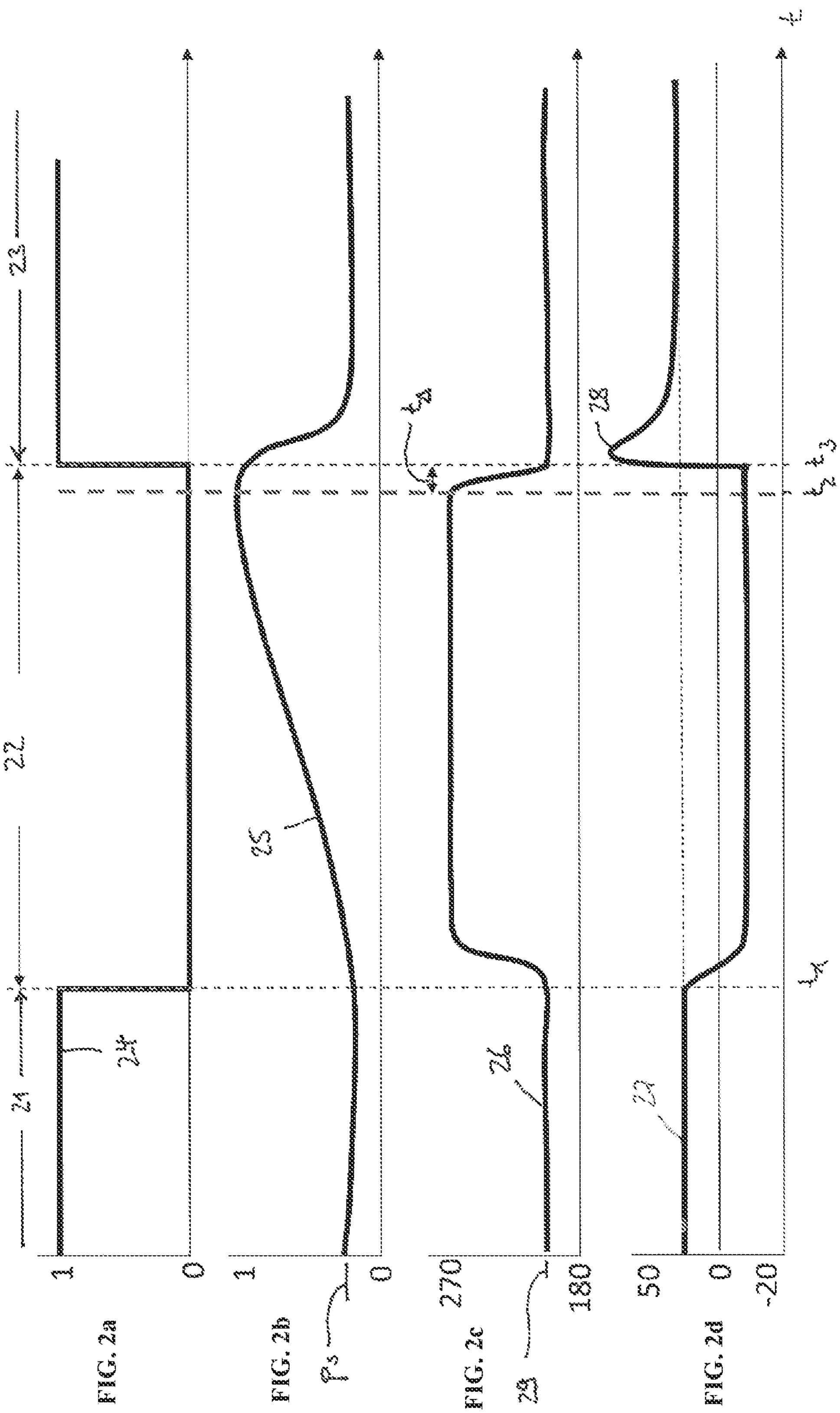
FIG. 2*a* shows a schematic, chronological development of the injection activity of a second internal combustion engine with a variable valve drive without pre-filling control according to the prior art when entering and exiting the overrun phase.
FIG. 2*b* shows a schematic, chronological development of the intake manifold pressure of the second internal combustion engine with a variable valve drive without pre-filling control when entering and exiting the overrun phase.
FIG. 2*c* shows a schematic, chronological development of the inlet valve closing time in °CA after TDC of the second internal combustion engine with a variable valve drive without pre-filling control when entering and exiting the overrun phase.
FIG. 2*d* shows a schematic, chronological development of the engine torque in Nm of the second internal combustion engine with a variable valve drive without pre-filling control when entering and exiting the overrun phase.

If the internal combustion engine 1 is to provide torque again, the inlet valve phase position is quickly adjusted to the conventional target position again, as can be seen from FIG. 2*c* between the points in time $t_2$ and $t_3$. Fuel injection 24 is omitted between these points in time. Already at the point in time $t_2$, which is shortly before the point in time $t_3$, the driver or a control device initiates a torque specification, which initiates the restart process of internal combustion engine 1. At the point in time $t_3$, the data processing for restarting the internal combustion engine 1 is complete.

In the overrun phases 22, the intake manifold pressure 25 increases continuously, for example due to leaks. If the overrun phase 22 lasts a relatively long time, for example when driving downhill, the intake manifold pressure 25 (FIG. 2*b*) can increase within the overrun phase 22 to such an extent that it almost corresponds to the ambient atmospheric pressure. If the refiring is initiated with an increased intake manifold pressure 25, this leads to a short-term strong build-up of torque with a torque peak 27 due to the high air mass. Generally, however, the objective is to engage the internal combustion engine 1 with a low torque. In this case, the strong build-up of torque leads to a loss of comfort.

Figures 3A, 3B, 3C, 3D:
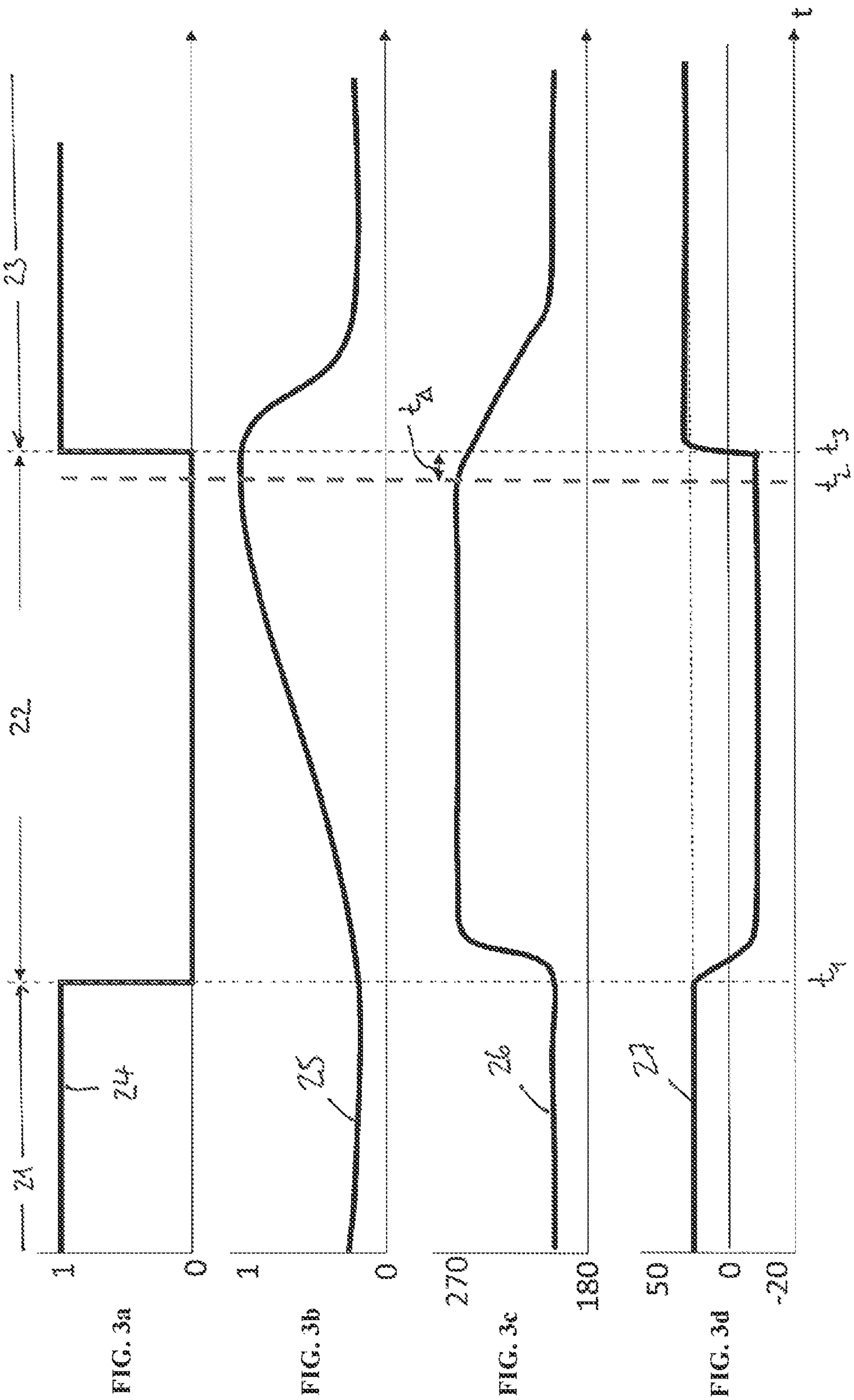
FIG. 3*a* shows a schematic, chronological development of the injection activity of a third internal combustion engine according to the disclosure with a variable valve drive and pre-filling control when entering and exiting the overrun phase.
FIG. 3*b* shows a schematic, chronological development of the intake manifold pressure of the third internal combustion engine according to the disclosure with a variable valve drive and pre-filling control when entering and exiting the overrun phase.
FIG. 3*c* shows the chronological, development of the inlet valve closing time in °CA after TDC of the third internal combustion engine according to the disclosure with a variable valve drive and pre-filling control when entering and exiting the overrun phase.
FIG. 3*d* shows a schematic, chronological development of the engine torque in Nm of the third internal combustion engine according to the disclosure with a variable valve drive and pre-filling control when entering and exiting the overrun phase.

FIGS. 3*a* to 3*d* schematically show the chronological development of the characteristic values of a third internal combustion engine 1, which, like the second internal combustion engine 1, has a variable valve drive 3 and is operated using the method according to the disclosure. The graph according to FIG. 3*a* corresponds to the graph of FIG. 2*a*. The internal combustion engine 1 is once again fired in the first firing phase 21, firing is stopped in the overrun phase 22, and the refiring phase 23 begins at the point in time $t_3$. The variable valve drive 3 is in turn used to prevent air scavenging, so that the operating method is the same as that of the second internal combustion engine up to the end of the overrun phase 22. As in the case of the second internal combustion engine 1, the development of the intake manifold pressure is therefore also identical (FIG. 3*b*).

At the point in time $t_2$, at which the restart request of the internal combustion engine 1 is triggered, in contrast to the second internal combustion engine, the inlet valve phase position is not adjusted as quickly as possible, but is adjusted to the conventional target position with a delay. The phase position adjustment rate or adjustment speed depends on how much the intake manifold pressure 25 has increased and what load is required of the internal combustion engine 1. As can be seen from FIGS. 3*a* to 3*d*, refiring takes place at the point in time $t_3$, which begins even though the inlet valve time does not yet correspond to the valve time corresponding to continuous operation at this load requirement, target valve time 29 at intake manifold desired pressure $p_s$. The time difference $t_\Delta$ between $t_3$ and $t_2$ is the time required to reach the target angle of the pre-control. The adjustment to the target valve time 29 at intake manifold desired pressure $p_s$ takes place as long as the intake manifold pressure has not yet reached its target pressure. Typical times can be assumed here, so that the adjustment could be performed in a controlled manner, but it can also be performed in a regulated manner. This also allows the adjustment speed to be adapted to the actual intake manifold pressure. Ideally, the inlet valve closing time 26 is adjusted in such a way that the engine torque 27 builds up monotonically and at the same time as quickly as possible.

The variable valve drive 3 is therefore used for the pre-control of the inlet valve closing time 26 when the internal combustion engine 1 is refired. This makes it possible to avoid a torque peak 28 when the pressure in the intake manifold is increased. For this purpose, the variable valve drive 3 deactivates the exhaust valves in the overrun phase 22 and reduces the engine drag torque by setting the inlet valve lift to be extremely late or retarded. With the torque specification by the driver, the stored filling model calculates the target control times for a torque-neutral engine restart based on the significant input variables. For the example selected, this means that the inlet valve lift phase position must be adjusted continuously, depending on the engine speed, but adjusted to be early more slowly than in the case without pre-control, until the intake manifold pressure is back at the target value and further load control, e.g., by throttle valve, can take place.

LIST OF REFERENCE SYMBOLS

1 Internal combustion engine
2 Cylinder head
3 Valve drive
4 Cylinder
5 Inlet valve
6 Exhaust valve
7 Intake camshaft
8 Exhaust camshaft
9 Camshaft adjuster, intake side
10 Camshaft adjuster, exhaust side
11 Electric motor
12 Control device
13 Drive gear
14 Switching device
15 Data connection
21 Firing phase
22 Overrun phase
23 Refiring phase
24 Fuel injection
25 Intake manifold pressure
26 Inlet valve closing time after TDC in °CA
27 Engine torque in Nm
28 Torque peak
29 Target valve time at intake manifold desired pressure
t Time
$t_1$ Point in time at which the internal combustion engine is switched off
$t_2$ Point in time of the restart request of the internal combustion engine
$t_3$ Point in time after data processing for restarting the internal combustion engine
$t_\Delta$ Time difference between $t_3$ and $t_2$
$p_s$ Intake manifold desired pressure

The invention claimed is:

1. A method for operating an internal combustion engine, comprising:

providing an internal combustion engine having:

a crankshaft configured to be driven by a piston of a cylinder, an intake manifold configured to supply fresh air to the cylinder, an inlet valve configured to open so that fresh air can flow from the intake manifold into the cylinder, and a variable valve drive configured to vary an opening duration or a timing of the inlet valve relative to a position of the crankshaft, and operating the internal combustion engine in a first firing phase, operating the internal combustion engine in an overrun phase during which: i) the internal combustion engine is dragged without fuel supply, and ii) a first inlet valve timing set by the variable valve drive provides a reduced or no air mass flow in the cylinder, requesting a refiring of the internal combustion engine, comparing an intake manifold pressure to an intake manifold desired pressure, determining, based on the comparison, a rate of adjusting the timing of the inlet valve to enable pre-filling control of fresh air into the cylinder, adjusting the timing of the inlet valve via the determined rate to allow a controlled amount of fresh air in the cylinder, and refiring the internal combustion engine.

2. The method according to claim 1, wherein the controlled amount of fresh air allowed in the cylinder via the variable valve drive is such that a torque which is built up does not exceed a torque target specification, or exceeds it by less than 50%.

3. The method according to claim 2, wherein the internal combustion engine further comprises an exhaust valve configured to be closed in the overrun phase.

4. The method according to claim 3, wherein no ignition angle intervention occurs when the internal combustion engine is refired.

5. The method according to claim 1, wherein the variable valve drive has an intake camshaft with an electric camshaft adjuster.

6. The method according to claim 1, wherein the internal combustion engine further comprises a throttle valve and the pre-filling control is carried out by the variable valve drive when the throttle valve is unable to carry out load control or load control by the throttle valve can only be carried out to a reduced extent.

7. The method according to claim 1, wherein the internal combustion engine is operated as part of a hybrid drive of a motor vehicle.

8. A control device configured to operate an internal combustion engine via the method according to claim 1.

9. The method according to claim 1, wherein the variable valve drive includes electro-hydraulically actuated valves.

10. The method according to claim 1, wherein a first determined rate of adjusting the timing of the inlet valve corresponds to a first comparison of a first intake manifold pressure to a first intake manifold desired pressure, and a second determined rate of adjusting the timing of the inlet valve corresponds to a second comparison of a second intake manifold pressure to a second intake manifold desired pressure, and the second determined rate is slower than the first determined rate.

11. The method according to claim 1, wherein the determined rate of adjusting the timing of the inlet valve is configured to achieve a second target inlet valve timing, and the second target inlet valve timing is not achieved at a time when the internal combustion engine is refired.

12. The method according to claim 1, wherein the timing of the inlet valve is adjusted continuously via the determined rate.

13. A method for operating an internal combustion engine, comprising:

providing an internal combustion engine having:

a crankshaft configured to be driven by a piston of a cylinder, an intake manifold configured to supply fresh air to the cylinder, an inlet valve configured to open so that fresh air can flow from the intake manifold into the cylinder, and a variable valve drive configured to vary an opening duration or a timing of the inlet valve relative to a position of the crankshaft, operating the internal combustion engine in an overrun phase during which: i) the internal combustion engine is dragged without fuel being supplied, and ii) a first inlet valve timing set by the variable valve drive provides a reduced or no air mass flow in the cylinder, requesting a refiring of the internal combustion engine, comparing an intake manifold pressure to an intake manifold desired pressure, determining, based on the comparison, a rate of adjusting the timing of the inlet valve to enable a pre-filling control of fresh air into the cylinder, and refiring the internal combustion engine, and wherein:

a first comparison corresponds to: i) a first difference between the intake manifold pressure and the intake manifold desired pressure, and ii) a first rate of adjusting the timing of the inlet valve, a second comparison corresponds to: i) a second difference between the intake manifold pressure and the intake manifold desired pressure, and ii) a second rate of adjusting the timing of the inlet valve, and the second difference is greater than the first difference, and the second rate is slower than the first rate.

14. The method according to claim 13, wherein the internal combustion engine further comprises an exhaust valve configured to be closed in the overrun phase.

15. The method according to claim 13, wherein no ignition angle intervention occurs when the internal combustion engine is refired.

16. The method according to claim 13, wherein the variable valve drive has an intake camshaft with an electric camshaft adjuster.

17. The method according to claim 13, wherein the determined rate of adjusting the timing of the inlet valve is configured to achieve a second target inlet valve timing, and the second target inlet valve timing is not achieved at a time when the internal combustion engine is refired.

18. A method for operating an internal combustion engine, comprising:

providing an internal combustion engine having:

a crankshaft configured to be driven by a piston of a cylinder, an intake manifold configured to supply fresh air to the cylinder, an inlet valve configured to open so that fresh air can flow from the intake manifold into the cylinder, and a variable valve drive configured to vary an opening duration or a timing of the inlet valve relative to a position of the crankshaft, and operating the internal combustion engine in an overrun phase during which: i) the internal combustion engine is dragged without fuel supply via an inertia of a motor vehicle, and ii) a first inlet valve timing set by the variable valve drive provides a reduced or no air mass flow in the cylinder, requesting a refiring of the internal combustion engine, comparing an intake manifold pressure to an intake manifold desired pressure, determining, based on the comparison, a rate of adjusting the timing of the inlet valve to enable pre-filling control of fresh air into the cylinder, adjusting the timing of the inlet valve via the determined rate to allow a controlled amount of fresh air in the cylinder, and refiring the internal combustion engine.

* * * * *